July 9, 1963  R. CLAAS  3,096,605
COMBINE HARVESTER
Filed Oct. 25, 1960
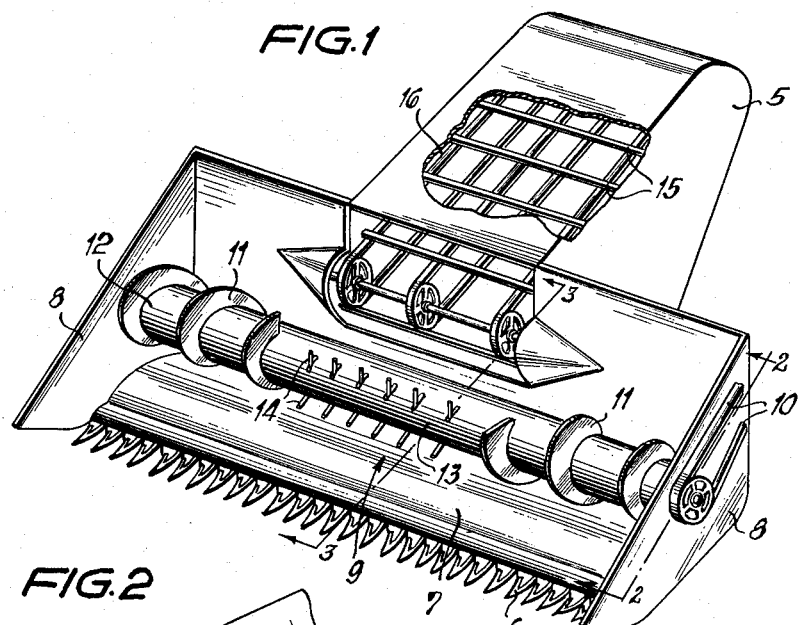
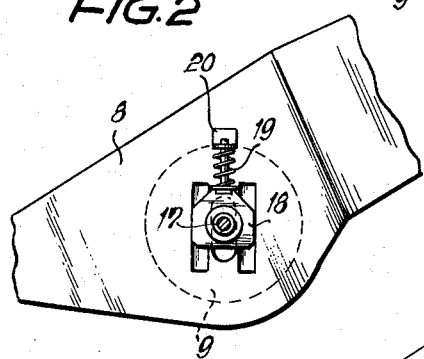
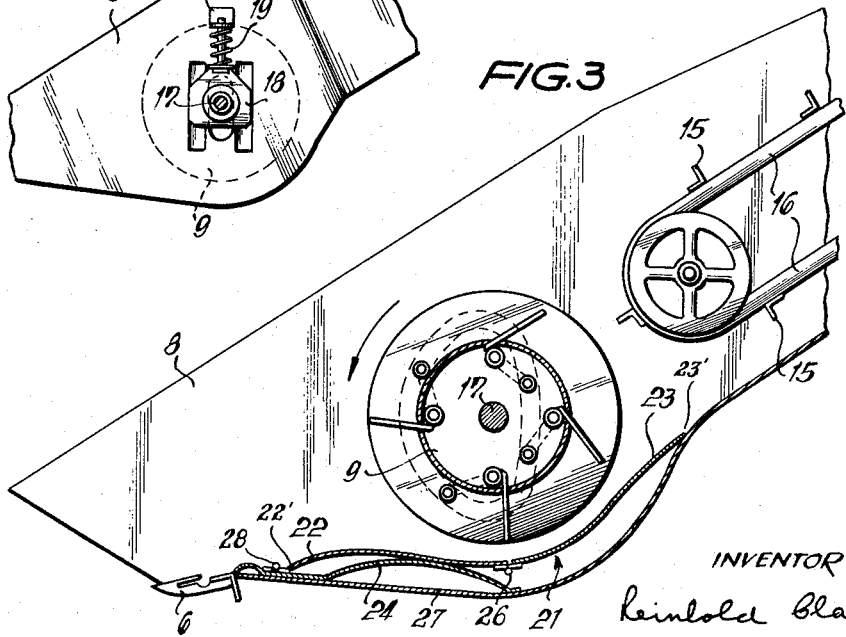
INVENTOR
Reinhold Claas
BY
Michael S Striker
Attorney

United States Patent Office 3,096,605
Patented July 9, 1963

3,096,605
COMBINE HARVESTER
Reinhold Claas, 64 August-Claas-Strasse,
Harsewinkel, Westphalia, Germany
Filed Oct. 25, 1960, Ser. No. 64,949
Claims priority, application Germany Oct. 27, 1959
3 Claims. (Cl. 56—23)

This invention relates to combine harvesters, and more specifically to a combine harvester which has a cutter platform for the reception thereon of a crop that is to be worked and a screw auger rotatably mounted above the cutter platform, the screw auger being fitted at each end with a helical flight feeding the crop in longitudinal direction and in the center with feed members acting in transverse direction, such as fingers arranged to be controlled in response to the angle of rotation of the screw auger, the fingers delivering the crop to a conveyor means. The helical flights at the ends of the screw auger convey the crop which has been cut or picked up from a swath toward the center section of the screw auger where the fingers cooperate with the conveyor means. The operational reliability of the known arrangements of the aforedescribed kind is, however, not entirely satisfactory especially when the working conditions vary or, for example, foreign bodies are swept on to the cutter platform.

The object envisaged by the present invention is the provision of a combine harvester of the aforedescribed kind which ensures a uniform feed and operates in a reliable manner even when the working conditions vary considerably.

For achieving this object, the invention proposes to contrive the cutter platform and the screw auger in such a way that the clearance gap between the cutter platform and the screw auger is operationally adjustable. The screw auger can thus functionally adapt itself to the actual working conditions, and trouble in operation will be avoided.

According to an important feature of the invention at least one of the members defining the gap may be yieldable and thereby permit the gap to adjust itself in width to the actual working conditions. Moreover, this feature obviates damage which might be otherwise caused by foreign bodies wedging between the platform and the screw auger.

The invention may be embodied in various ways: For instance, the screw auger may be mounted in bearings which are movable relative to the cutter platform. In such a form of construction, it is by no means essential that the screw auger bearings should be interconnected in order to keep them in parallelism, since the yielding deflections of the screw auger in operation are generally small in relation to its overall length, so that differences in the deflection of the two ends of the screw auger cause negligible angles of cant which have no adverse effects. Generally, it may be preferred to provide springs for cooperating with these bearings movable relative to the cutter platform. These springs may either resist the yielding deflection of the screw auger or they may compensate part of its weight. As a rule, the springs will be designed to apply an additional load to the screw auger.

Alternatively, the invention may be carried into effect by arranging the cutter platform surface immediately under the screw auger to be elastically yieldable, the screw auger itself turning in fixed or likewise yieldable bearings, as may be desired. These alternatives offer possibilities for particularly simple forms of construction in which the yielding disposition of the movable members has no effect upon the means driving the screw auger. The latter type of construction is particularly advantageous when the cutter platform surface under the screw auger is formed by a plurality of preferably hingedly connected, deflectable members which can be depressed against spring supports. Alternatively, the cutter platform itself under the screw auger may be resilient.

Two preferred embodiments of the invention will now be described by way of example and with reference to the accompanying drawing, in which:

FIG. 1 is a perspective view of a cutter assembly of a combine harvester according to the invention with parts broken away;

FIG. 2 is a part sectional view on an enlarged scale of a bearing mounting of the arrangement of FIG. 1, the section being taken along line 2—2 of FIG. 1; and FIG. 3 is a sectional view of a modified form of construction, the section being taken along line 3—3 of FIG. 1 and drawn to an enlarged scale.

With reference now to FIG. 1, the combine harvester has a cutter assembly 5. Extending across the width of a cutter platform 7 is a cutter bar 6. The cutter platform 7 upon which the crop to be worked is received is laterally bounded by walls 8. Rotatably mounted between the side walls 8 is a screw auger 9 which is driven, for instance, by means of a V-belt 10. The screw auger 9 has at each end thereof a section 12 fitted with a helical flight 11, whereas fingers 14 project from a center section 13 thereof, the fingers 14 delivering the crop which the helical flights 11 have conveyed towards the center section 13 of the screw auger to a conveyor means which, in the form of construction shown in the drawing, may be endless belts 16 fitted with bars 15. As can be seen from FIG. 2, a journal 17 is provided at each end of the screw auger 9, and the invention proposes to mount these journals in bearings 18 which are vertically displaceably mounted in the side walls 8 of the cutter platform 7. Moreover, each bearing 18 is associated with a spring 19 for applying an additional load to the screw auger, one end of the spring 19 bearing against an abutment 20 fixedly mounted on the side wall 8.

It will be readily seen that this arrangement permits the width of the gap between the cutter platform 7 and the screw auger 9 to adapt itself automatically to the actual working conditions by the screw auger with its bearings adjusting itself according to the volume of crop received on the cutter platform.

In the embodiment shown in FIG. 3, the screw auger 9 is arranged to turn in stationary bearings mounted in the side walls 8 of the cutter platform. Situated below the screw auger is a yielding means 21 of the cutter platform which may consist of deformable wall means, for instance, in the form of a plurality of sections 22 and 23 hingedly connected one to the other at adjacent edges by a hinge 26 and is supported by at least one leaf spring 24. The front edge 22' of section 22 is connected to the bottom wall 27 of the cuter platform by a hinge 28 whereas the rear edge 23' of section 23 slidably abuts against bottom wall 27 so that the deformable wall means 22, 23 form with portions of the bottom wall 27 outside the edges 22', 23' a continuous surface over which the material may be fed by the edge. This arrangement likewise permits the width of the gap to adapt itself to the actual working conditions.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:
1. In a combine harvester, in combination, a cutter platform adapted to receive the material which is worked on by the harvester and having a bottom wall and a pair of side walls; a rotary auger located over and adjacent said bottom wall and being mounted in said side walls turnable about a fixed axis substantially parallel to the bottom wall for feeding material received by said cutter platform; and yieldable means between said auger and said bottom wall and including deformable wall means movably attached along one edge thereof to said bottom wall and slidably abutting along an opposite edge thereof against said bottom wall while being spaced between said edges from said bottom wall and forming with portions of the latter outside said edges a continuous surface over which the material may be fed by said auger, said yieldable means including further spring means engaging said deformable wall means for yieldably maintaining the latter in a predetermined position with respect to said auger.

2. In a combine harvester as set forth in claim 1 in which said deformable wall means include a pair of elongated sections hingedly connected to each other along adjacent edges for turning movement relative to each other about an axis parallel to said axis of said auger and in which the other edge of one of said sections is hingedly connected to said bottom wall for turning movement about an axis parallel to said auger axis while the other edge of the other section slidably abuts against said bottom wall.

3. In a combine harvester as set forth in claim 1 in which said spring means is formed by a curved leaf spring located in the space between said bottom wall and said deformable wall means.

References Cited in the file of this patent

UNITED STATES PATENTS

| | | |
|---|---|---|
| 2,310,282 | Gauss | Feb. 9, 1943 |
| 2,484,228 | Isay | Oct. 11, 1949 |
| 2,630,664 | Hansen | Mar. 10, 1953 |
| 2,748,921 | White | June 5, 1956 |
| 2,895,590 | Snow | July 21, 1959 |